Patented Sept. 22, 1942

2,296,371

UNITED STATES PATENT OFFICE 2,296,371

PARAFFIN REACTION

Ober C. Slotterbeck, Clark Township, Union County, and Raphael Rosen, Elizabeth, N. J., assignors to Standard Oil Development Company, a corporation of Delaware No Drawing. Application December 15, 1939, Serial No. 309,406

11 Claims. (Cl. 196—10)

The present invention relates to the reaction of isoparaffins with other paraffinic hydrocarbons in the presence of a catalyst under conditions known to promote alkylation reactions.

In a co-pending application, Ober C. Slotterbeck, Serial No. 309,405 filed December 15, 1939, there is described a novel alkylation catalyst consisting of a composition resulting from the saturation of a hydrogen fluoride-water mixture with boron fluoride. This catalyst as disclosed in that application is capable of effecting the condensation of mono-olefins with paraffinic hydrocarbons containing at least one tertiary carbon atom per molecule to produce saturated, branched-chain paraffins having valuable motor fuel properties. It has now been found that this catalyst is also capable of effecting a condensation of isoparaffins with other paraffinic hydrocarbons.

In general, it is known that the paraffinic hydrocarbons, especially the lower members of the aliphatic series, are relatively inert from the standpoint of their reactivity with other compounds, organic or inorganic. A remarkable discovery has now been made. It has been found to be possible to effect a reaction of paraffins containing at least one tertiary carbon atom per molecule with other paraffins having either a branched- or straight-chain structure in the presence of a catalyst composition, resulting from the mixing of boron fluoride, hydrogen fluoride, and water, under alkylating conditions.

It is an object of the present invention to react a paraffin containing at least one tertiary carbon atom per molecule with another paraffin, having either a straight-chain or branched-chain structure, in such a manner as to produce saturated liquid hydrocarbons.

It is a further object of the invention to react relatively low octane number, liquid, paraffinic hydrocarbons having branched- and/or straight-chain structures with low boiling paraffins containing at least one tertiary carbon atom per molecule to produce motor fuels of improved octane number.

It is a further object of this invention to produce a mixture of liquid saturated hydrocarbons suitable for use as motor fuels or as blending agents for motor fuels by reacting waste refinery gases, one constituent of which contains at least one tertiary carbon atom per molecule, with normally liquid paraffins in the presence of a $BF_3$—$H_2O$—$HF$ catalyst composition under alkylation conditions.

These objects, as well as others which will be apparent from the following description of the invention are accomplished by introducing mixtures of paraffins such as those described above into an alkylation reactor under suitable alkylation conditions in the presence of a $BF_3$–$H_2O$–$HF$ catalyst composition.

The catalyst composition may be prepared by admixing water, boron fluoride and hydrogen fluoride in any manner. One method of manufacturing the catalyst composition involves the preparation of a saturated solution of boron fluoride in water and the introduction of anhydrous hydrogen fluoride or commercial hydrogen fluoride (usually at 48% aqueous solution) into this solution. Any desired amount of hydrogen fluoride may be introduced into the boron fluoride-water solution. The preferred procedure for making up the catalyst consists of introducing the desired quantity of hydrogen fluoride into water and then saturating this aqueous hydrogen fluoride solution with boron fluoride. In preparing the catalyst composition according to the former method, it is sometimes necessary to filter the catalyst composition to remove any precipitate formed therein. Usually, no precipitate is formed in the preparation of the catalyst by the preferred procedure, so that, in this case, filtering is unnecessary. The catalyst compositions are prepared at room temperature. The exact nature of the catalyst is not known and its composition varies to some extent with the specific method used for its preparation.

Depending on the concentration of hydrogen fluoride present in the novel catalyst, the freezing point of the catalyst varies between about $-15°$ C. and about $+23°$ C. The temperatures employed for the reactions of the present invention may range from just above the freezing point of the catalyst composition to about 200° C. or even higher. However, it is preferred to operate at temperatures between about 50° and about 120° C. When operating at the higher temperatures, it is advantageous to employ superatmospheric pressures in order to maintain the reactants in the liquid phase, since it has been found that efficient contacting of the several reactants with each other and the catalyst is conducive to higher yields of the condensation products. Such contacting is more easily accomplished by intensive agitation when the reactants are in the liquid phase. The time of reaction may vary between about 2.5 and about 30 hours, preferably being between about 10 and about 25 hours. The rate of conversion is considerably higher at elevated reaction temperatures than at low reaction temperatures. Therefore, the time of contact may be adjusted so that a shorter time of contact will be employed at the higher temperatures and a longer time of contact at the lower temperatures. It is ordinarily satisfactory to use reaction times of between about 5 hours and about 15 hours when employing temperatures of between about 40° and about 120° C.

It is contemplated to carry out the reactions in either the liquid or vapor phase, although for a commercial operation it is preferred to employ superatmospheric pressures at least sufficient to maintain the reactants in the liquid phase. Pressures of between about 1 and about 100 atmospheres may be employed. However, pressures of between about 3 and about 10 atmospheres are sufficient when operating under the preferred conditions and employing ordinary refinery hydrocarbon feed stocks, for example, field butanes and the like.

It has been found to be desirable to maintain a substantial excess of the hydrocarbon containing at least 1 tertiary carbon atom per molecule in the reaction zone. The molar ratio of the isoparaffin to the other paraffinic reactants may range from about 1:1 to about 3:1. However, it is preferred to operate with a reaction mixture containing the isoparaffin and the other paraffinic reactant in a molar ratio of between about 2:1 and about 10:1. In cases where both of the reactants are isoparaffinic in nature, it is preferred to have the isoparaffin of the lower boiling point present in substantial excess of the isoparaffin of the higher boiling point, although the operation may be carried out in the presence of an excess of the higher boiling point isoparaffin.

The process of the present invention may suitably be carried out in any apparatus which has heretofore been employed for polymerization or alkylation processes, such as, for example, those employed when using concentrated sulfuric acid as the catalytic agent. The catalyst of this invention is liquid under the conditions of reaction and also immiscible with the hydrocarbon reactants and products. Conventional settling tanks may therefore be employed in commercial units for separating the partially spent catalyst from the product. Such catalytic material may then be returned to the alkylation reactor, as in the case of sulfuric acid alkylation processes. It is desirable, when employing the novel catalyst composition for the condensation of paraffins with paraffins, to recycle to the reaction zone the undesired by-products of the reaction. Thus, when a product consisting of a C₆—C₉ hydrocarbon fraction is desired, any unreacted hydrocarbons as well as the lower boiling products of the reaction, that is, those products boiling below the initial boiling point of the desired product, and the higher boiling products, that is, those products boiling above the final boiling point of the desired product, may be separated by fractional distillation or other suitable means from the desired product and returned in whole or in part to the original reaction zone in order to materially increase the yields (based on the fresh paraffins fed to the unit) of the desired products.

Any of the members of the paraffin series containing at least 1 tertiary carbon atom per molecule may be used as reactants in the present process. Thus, for example, isobutane, isopentane, the isohexanes, the isoheptanes, and the iso-octanes may be employed. Furthermore, mixtures of two or more of these hydrocarbons or mixtures of paraffinic hydrocarbons containing isoparaffins for example, aviation alkylate, having any desired boiling range, for example, 23° through 145° C., prepared by alkylating isobutane with butylenes in the presence of concentrated sulfuric acid, or other low boiling alkylates, may be employed. Likewise, alkylate bottoms, that is, the higher boiling alkylates, may be employed as feed stocks or as a portion of the feed stocks in the present process, in which case safety fuels are produced. The feed stock for the present process may be composed entirely of isoparaffins or mixtures of isoparaffins, as above set forth. However, normal paraffins may likewise be employed as reactants provided at least one isoparaffin containing at least one tertiary carbon atom per molecule is also present in the feed stock. Thus, for example, the feed stocks may contain normal pentane, normal hexane, normal heptane, normal octane, normal nonane, and their higher homologues or mixtures of two or more of these straight-chain paraffinic hydrocarbons. One suitable source of higher boiling, straight-chain paraffins is paraffin wax. Furthermore, straight run naphthas and field butanes are suitable sources of paraffins for feed stocks for the present process. The octane number of straight run naphthas may be improved by contacting mixtures of straight run naphthas and isobutane, isopentane, mixtures of these, or mixtures of any of the above-mentioned isoparaffinic reactants with the catalyst composition under the conditions heretofore specified. Although the process of the present invention may be carried out by reacting a high boiling isoparaffinic constituent of the feed with a low boiling, straight-chain paraffinic constituent, it is preferred to carry out the reaction with feed stocks in which the lower boiling reactants contain the tertiary carbon atoms.

Other sources of supply of suitable feed stocks are readily available to refinery operators. Thus, for example, C₄ and/or C₅ cuts, from which the major portion of the olefins has been removed, may be employed in the feed stocks of the present invention. These refinery cuts may be obtained from catalytic and/or thermal cracking units, from refinery stabilizer bottoms, from catalytic or thermal polymerization and/or polymerization processes, and the like.

The process may be carried out either by a batch or continuous type of operation, although it is preferred to carry out the process continuously. Higher yields are obtained if the feed stock and the catalyst are intimately contacted under the condensation conditions. In the case of batch operations, mechanical stirrers or shakers provide adequate agitation. In the case of continuous operations, the use of turbo mixers, the introduction of the feed into the reactor through jets of restricted internal diameter or porous thimbles, or the like results in ample agitation of the reaction mass.

The novel catalyst gradually becomes less effective for promoting the condensation reaction as its length of service increases. This is partially due to a gradual dilution of the catalyst by water introduced in small amounts with the hydrocarbon feed, and high molecular weight hydrocarbons which do not readily separate from the catalyst during the ordinary operation of the process. The catalyst concentration may be maintained to some extent by the addition of small amounts of hydrogen fluoride and/or boron fluoride either continuously or intermittently, to the catalyst composition as it is being returned to the reaction zone from the catalyst-hydrocarbon settler. However, after prolonged usage, the catalyst composition becomes degraded to a point where its catalytic activity is quite low. When such a stage of catalyst activity has been reached, the spent catalyst is subjected to a regeneration treatment. In this treatment, the catalyst is diluted with water until the high molecular weight hydrocarbons separate out as a distinct hydrocarbon layer. This supernatant layer is then decanted from the aqueous solution and discarded. The aqueous solution may then be subjected to one of two procedures. The excess water may be removed from the catalyst by a physical means, such as distillation or solvent extraction, or a chemical means, such as the use of dehydrating agents. However, the preferred procedure for regenerating the catalyst involves the addition of an amount of hydrogen fluoride to the catalyst layer sufficient to bring the hydrogen fluoride content of the catalyst up to its original value and a subsequent similar addition of boron fluoride. Such a procedure is more preferable than one involving the addition of boron fluoride followed by the addition of hydrogen fluoride or a procedure wherein hydrogen fluoride and boron fluoride are added simultaneously to the catalyst layer.

A modified procedure for the regeneration of the catalyst embodies a partial removal of the excess water by either mechanical or chemical means and the subsequent addition of hydrogen fluoride followed by the addition of boron fluoride to the catalyst layer. Such a combined procedure is employed when it is desired to maintain the volume of regenerated catalyst constant with respect to the volume of the spent catalyst withdrawn from the condensation system.

The following examples are intended to be illustrative of the invention described herein but are not to be considered as in any way limiting the scope of the appended claims.

*Example 1*

A mixture of 50 grams of iso-octane (2,2,4-trimethyl pentane) and 130.4 grams of iso-pentane was introduced into an autoclave, together with about 37% by volume (based on the total hydrocarbon charged to the reactor) of a $BF_3$—$H_2O$—$HF$ catalyst. The catalyst was prepared by adding 18% by weight of anhydrous hydrogen fluoride to a saturated aqueous solution of boron fluoride; a crystalline precipitate formed during the preparation of the catalyst and was removed by filtration. The autoclave was maintained at a temperature of between about 55° C. and 60° C. for a period of about 16 hours. During this time, the autoclave was shaken vigorously. At the end of this period, the hydrocarbon layer was separated from the reaction mixture and was fractionated. A 154 weight per cent yield (based upon the 2,2,4-trimethyl pentane charged) of product above 40° C. was obtained.

*Example 2*

130.4 grams of isopentane were admixed with 50 grams of alkylated bottoms, obtained from the reaction of isopentane with a refinery $C_4$ cut containing butylenes in the presence of concentrated sulfuric acid under alkylation conditions. These bottoms had an initial boiling point of 145° C. and were substantially completely saturated in character. To the mixture of isopentane and alkylate bottoms were added 123.5 grams of catalyst, prepared by adding 50 grams of 48% aqueous hydrogen fluoride to 100 grams of water and saturating the solution with boron fluoride. The catalyst composition contained 9.7% of hydrogen fluoride and 69.7% of boron fluoride, the remainder being water. This catalyst-hydrocarbon mixture was introduced into a reaction bomb, which was maintained at about 50° C. to about 60° C. and vigorously shaken for about 24 hours. A product yield of about 174 weight per cent, based upon the alkylate bottoms introduced into the reactor, was obtained.

*Example 3*

A mixture of 217.3 grams of isopentane and 50 grams of normal heptane, together with about 24% by volume of a catalyst prepared by adding 100 grams of a 48% aqueous hydrogen fluoride solution to 25 grams of water and saturating the mixture with boron fluoride, was introduced into an autoclave, which was maintained at a temperature of about 100° C. to about 106° C. and vigorously shaken for about 19 hours. The yield of product boiling above 40° C. amounted to about 124 weight per cent, based upon the normal heptane in the reaction mixture.

Having described fully the invention and having set forth the nature and objects of the invention and illustrated the same, what is claimed as new and useful and desired to be secured by Letters Patent is:

1. A process for the production of branched-chain paraffins boiling within the gasoline range which comprises reacting at least one paraffin containing at least one tertiary carbon atom per molecule with another paraffin of higher molecular weight in the presence of a catalyst prepared by mixing only boron fluoride, water, and hydrogen fluoride, the reaction being carried out under alkylating conditions.

2. A process for the production of branched-chain paraffins boiling within the gasoline range which comprises reacting at least one paraffin containing at least one tertiary carbon atom per molecule with another paraffin of higher molecular weight in the presence of a catalyst prepared by introducing hydrogen fluoride into water and saturating the resultant mixture with boron fluoride, the reaction being carried out under alkylating conditions.

3. A process for the production of paraffinic motor fuels of improved octane number which comprises reacting paraffinic hydrocarbon mixtures boiling in the motor fuel range and of relatively low actane number with at least one paraffin containing at least one tertiary carbon atom per molecule in the presence of a catalyst prepared by admixing only hydrogen fluoride, water, and boron fluoride, the reaction being carried out under alkylating conditions.

4. A process as in claim 2 wherein the reaction temperature is between about the freezing point of the reaction mixture and about 200° C., sufficient pressure being applied to maintain the reaction mixture in the liquid phase.

5. A process as in claim 2 wherein the reaction temperature is between about the freezing point of the reaction mixture and about 200° C., sufficient pressure being applied to maintain the reaction mixture in the liquid phase, and wherein the reaction is carried out continuously with intensive agitation of the reaction mixture.

6. A process for the production of branched-chain paraffins which comprises contacting an isoparaffin containing at least one tertiary carbon atom per molecule with an alkylate having an initial boiling point of 145° C. in the presence of an HF—$H_2O$—$BF_3$ catalyst mixture with vigorous agitation at a temperature of between about 50° and about 60° C. until the reaction has attained substantial equilibrium.

7. A process as in claim 6 wherein the alkylate boils between about 23° and about 145° C.

8. A process as in claim 6 wherein the isoparaffin containing at least one tertiary carbon atom per molecule is a mixed refinery $C_4$ and $C_5$ cut containing isobutane and isopentane, the time of contact being between about 10 and about 25 hours.

9. A process for the production of branched-chain paraffins which comprises reacting isopentane with n-hexane at a temperature of about 100° C. with vigorous agitation for about 19 hours in the presence of a catalyst composition prepared by adding aqueous HF to water and saturating the mixture with $BF_3$.

10. A process as in claim 9 wherein the isopentane: n-hexane molar ratio is between about 2:1 and about 10:1.

11. A process for the production of branched-chain paraffins boiling within the gasoline range which comprises contacting a refinery $C_4$ cut containing isobutane and normal butane with a straight run naphtha with vigorous agitation at a temperature of between about 80° and about 200° C. for from about 10 to about 25 hours in the presence of a catalyst composition prepared only from HF, $H_2O$, and $BF_3$, and recovering the desired motor fuel fractions.

OBER C. SLOTTERBECK.
RAPHAEL ROSEN.